United States Patent [19]

Blough

[11] Patent Number: 4,804,289

[45] Date of Patent: Feb. 14, 1989

[54] CONNECTOR FOR REFUSE CONTAINER AND COMPACTOR

[75] Inventor: James A. Blough, Hesston, Kans.

[73] Assignee: H.E.P. Environmental Services, Inc., Dallas, Tex.

[21] Appl. No.: 15,149

[22] Filed: Feb. 17, 1987

[51] Int. Cl.⁴ ........................ F16B 21/09; B30B 15/04

[52] U.S. Cl. ........................ 403/24; 403/321; 403/353; 100/229 A; 414/723

[58] Field of Search ........................ 403/24, 13, 14, 353, 403/321, 375; 100/229 A; 220/1.5, 23.4; 414/406, 408, 409, 410, 723

[56] References Cited

U.S. PATENT DOCUMENTS

| | | | |
|---|---|---|---|
| 2,630,303 | 3/1953 | Krucker | 403/353 X |
| 3,229,622 | 1/1966 | French et al. . | |
| 3,243,066 | 3/1966 | Gardner et al. | 414/723 X |
| 3,662,910 | 5/1972 | Herpich et al. . | |
| 3,910,434 | 10/1975 | Ebeling et al. | 414/408 |
| 4,134,564 | 1/1979 | Hanna | 403/353 X |
| 4,297,074 | 10/1981 | Ballinger | 403/321 X |
| 4,464,987 | 8/1984 | Heinrich . | |
| 4,538,512 | 9/1985 | Blough | 100/229 A X |

FOREIGN PATENT DOCUMENTS

| | | | |
|---|---|---|---|
| 2087790 | 6/1982 | United Kingdom . | |

*Primary Examiner*—Andrew V. Kundrat
*Assistant Examiner*—Peter M. Cuomo
*Attorney, Agent, or Firm*—Kokjer, Kircher, Bradley, Wharton, Bowman & Johnson

[57] ABSTRACT

Apparatus for releasably locking a refuse container to a trash compactor in the form of a pair of identical locking arms projecting outwardly from the container at either side of the loading opening in the end of the container. The locking arms are of plate material with leading edges inclined downwardly and toward the container to cam the container upwardly on corresponding locking pins projecting horizontally outwardly from the sides of the compactor. A vertically extending notch in each arm receives its corresponding pin to lock the container to the compactor as the container is moved into loading position adjacent the compactor.

4 Claims, 1 Drawing Sheet

CONNECTOR FOR REFUSE CONTAINER AND COMPACTOR

This invention relates to refuse handling equipment, and more particularly to apparatus for releasably interconnecting a refuse container with a stationary refuse compactor.

Prodigious quantities of solid waste and refuse are generated by modern civilizations. Environmental protection considerations mandate that the refuse which is generated must be collected frequently and subjected to appropriate disposal. In order to hold the costs of transportation and handling to a minimum, steps are often taken to reduce the volume of the waste material. Establishments such as supermarkets, restaurants, factories and the like which generate substantial amounts of refuse commonly utilize stationary compactors which compress the material before it is transported to a disposal dump or other waste receiving facility.

Large, heavy containers are provided at the compactor outlets for receiving and holding the compressed refuse. Usually, the compactor incorporates a reciprocating ram which serves as a "stuffer" to force the material into the container, compacting the material during the transfer process. The container is moved into closely abutting relationship with the compactor outlet so that the compactor outlet opening is in register with an inlet opening in the container while the loading of the container is carried out.

When a container has been filled, the container is emptied and reinstalled into position to be filled again by refuse from the compactor. Most containers are specially fabricated so that they can be hoisted and swung from their loading positions by components of a trash hauling truck to overhead and inverted positions wherein the contents of the container are dumped directly into the truck. When empty, the truck components (usually hydraulicly operated arms) are manipulated to return the container to its refuse receiving position.

The trash compacting forces generated by the reciprocating ram of the compactor have a tendency to push horizontally on the container and force it away from the compactor. This results in a leakage of some of the refuse from the trash handling equipment during the loading of the container. Such leakage is a nuisance and cannot be tolerated.

Various devices have been used for fastening the container to the stationary compactor to obviate the leakage condition. These have included turnbuckles as well as spring loaded locks or catches which releasably secure the container and compactor together.

None of the releasable locking devices heretofore utilized have worked very well. A primary fault has been the relative difficulty associated with properly positioning the container adjacent the stationary compactor for the mating parts of such devices to move into register. Another fault has been the requirement for the expenditure of additional time and effort to release the container when the contents are to be dumped into the hauling vehicle. Desirably, the container could be released from the compactor, dumped, and reinstalled into its position locked to the compactor entirely by the operator of the trash truck without the necessity for the operator to leave the driver's seat.

Accordingly, it is a primary object of the present invention to provide novel locking apparatus for releasably locking a container to a refuse compactor which apparatus may be secured or released by an operator from the refuse hauling vehicle.

Another important object of the present invention is to provide locking apparatus of this type which may be quickly and easily engaged and released yet which positively secures the container to the compactor to insure against inadvertent spillage as refuse is loaded into the container.

A yet further object of this invention is to provide interlocking apparatus which is constructed to take advantage of the inherent weight of container used for this purpose to prevent accidental separation from the compactor, yet which permits ready separation when the container is hoisted for emptying.

A still further object of the present invention is to provide a construction for such interlocking apparatus which is rugged and easy to operate so that it will withstand the rough handling to which refuse handling equipment is often subjected and which does not require the attention of workmen other than the operator of the refuse truck.

These and other important aims and objectives of the present invention will be further explained or will become apparent from the following example and description of the figures of the drawing, wherein.

Figure 2:
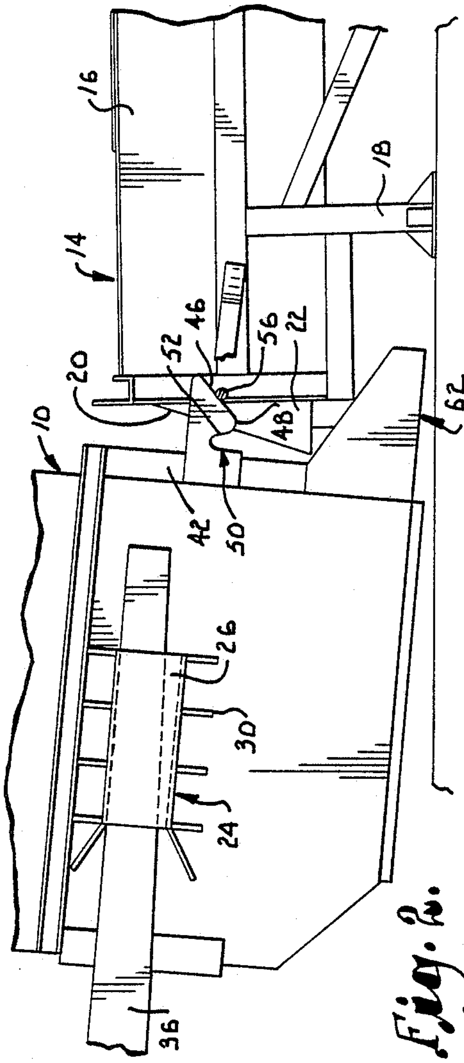
FIG. 2 is a fragmentary, side elevational view of a container about to be moved by the lifting components of a refuse truck into position for locking to a compactor, parts being broken away to reveal details of construction.
Figure 1:
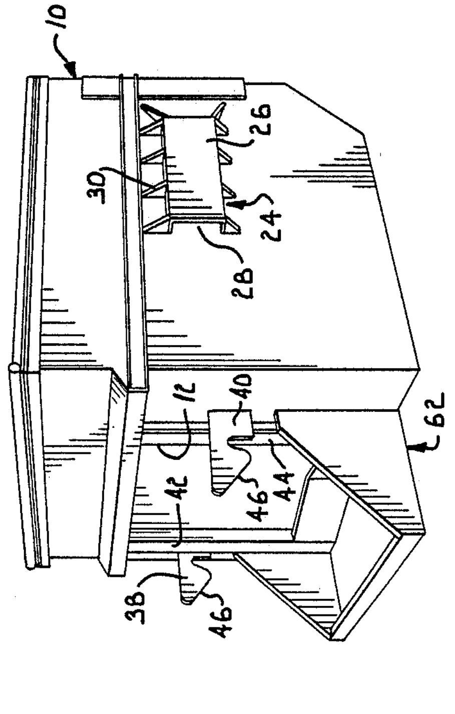
FIG. 1 is a perspective view of a refuse container equipped with locking arms embodying the priniples of this invention.

Referring now to the drawings in more detail, the reference numeral 10 generally designates a typical, relatively massive, box-like container for receiving refuse. To this end, container 10 is provided with a generally rectangular opening 12 in one end of the container for the transfer of refuse into the container. Container 10 is adapted to be utilized in conjunction with a generally horizontally disposed compactor 14 which compresses and forces refuse into the container. Compactor 14 has a hollow body 16 supported by vertical legs 18 in a stationary position. A reciprocating piston (not shown) in body 16 compresses refuse inserted into the compactor and forces the refuse through an outlet opening 20 in the discharge chute 22 of the compactor.

Container 10 is constructed for manipulation to and from a loading position with the opening 12 of the container in register with the compactor opening 20. In view of the great weight of container 10, especially when loaded with compacted refuse material, the manipulation of the container is carried out by auxiliary refuse handling equipment. Elongated, rigid receivers 24 are welded to each side of container 24 as shown in the drawing. The receivers 24 are desirably formed from channel members 26 positioned as shown to provide elongated slots 28 between the channel member and the side of the container to which it is attached. A plurality of gussets 30 are advantageously welded at spaced apart locations to the channel member and to the container side wall to reinforce the receiver. Further, a pair of diverging guide members 32 and 34 are welded in the positions shown adjacent the entrance end of each receiver to facilitate the insertion of the elongated lifting arms 36 of a trash hauling vehicle or the like (not shown).

The trash hauling vehicle forms not part of the instant invention per se and need not be described in detail. It suffices to point out that the construction and operation of a vehicle capable of hoisting refuse containers, such as container 10, into inverted, overhead dumping positions is shown and described in U.S. Pat. No. 4,538,512 issued Sept. 3, 1985. The disclosures of the aforesaid patent are incorporated herein by reference. The lifting arms 36 of the hauling vehicle are inserted into the respective slots 28 on the sides of the container for hoisting and manipulating the container.

The end of container 10 provided with opening 12 has a pair of identical locking arms or lugs 38 and 40 welded to uprights 42 and 44 defining the sides of opening 12 as shown in the figures of the drawing. The arms 38 and 40 are elongated, rigid members formed from steel plate and welded so that the major surfaces of the arms lie in vertical planes with the arms projecting outwardly from the container on either side of the container opening.

Each of the arms 38 and 40 is provided with a leading end or surface 46 which is inclined downwardly and toward the container to provide a camming surface as will be hereinafter more fully explained. A short, downwardly convex transition edge or surface 48 interconnects camming surface 46 with a downwardly opening, vertically extending notch 50 in each arm 38 and 40. The edge 52 of each notch 50 proximal the transition surface 48 is inclined downwardly and outwardly at a small angle from the vertical as shown.

Figure 5:
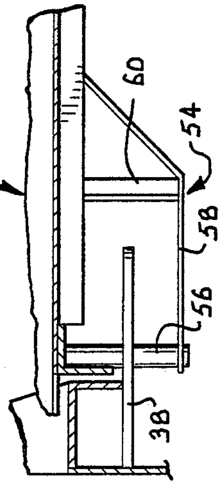
FIG. 5 is an enlarged, detailed cross-sectional view taken along line 5—5 of FIG. 4.

Each side of compactor 14 is provided with its respective locking pin means 54, only one of which is shown in the drawing. It will be understood that the locking pin means on each side of the compactor are substantially mirror images of one another and each is constructed basically as shown best in FIG. 5. Means 54 includes an elongated, transversely circular locking pin 56 having one end thereof welded to the proximal side of compactor 14 in disposition projecting substantially horizontally and at right angles to the compactor side. An elongated, rigid strap or brace 58 is rigidly secured to the outermost projecting end of the pin and to the side of the compactor as shown. An intermediate, strengthening brace 60 is welded to compactor 14 and to brace 58 for stabilizing the latter.

Figure 4:
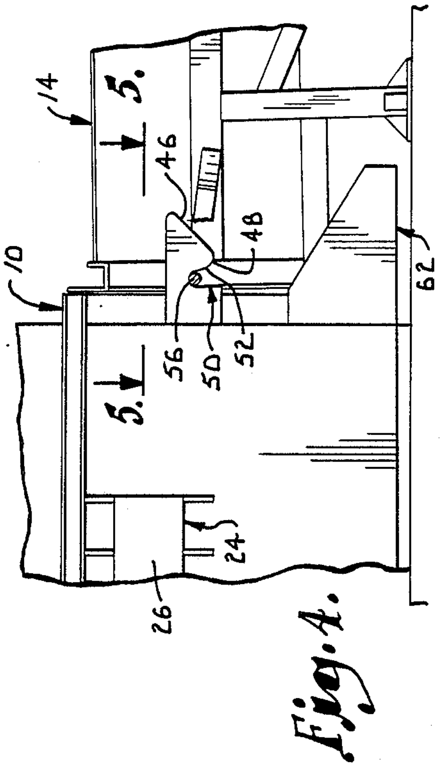
FIG. 4 is a view similar to FIGS. 2 and 3 but showing the container in the fully locked position and ready for the transfer of refuse into the container.
Figure 3:
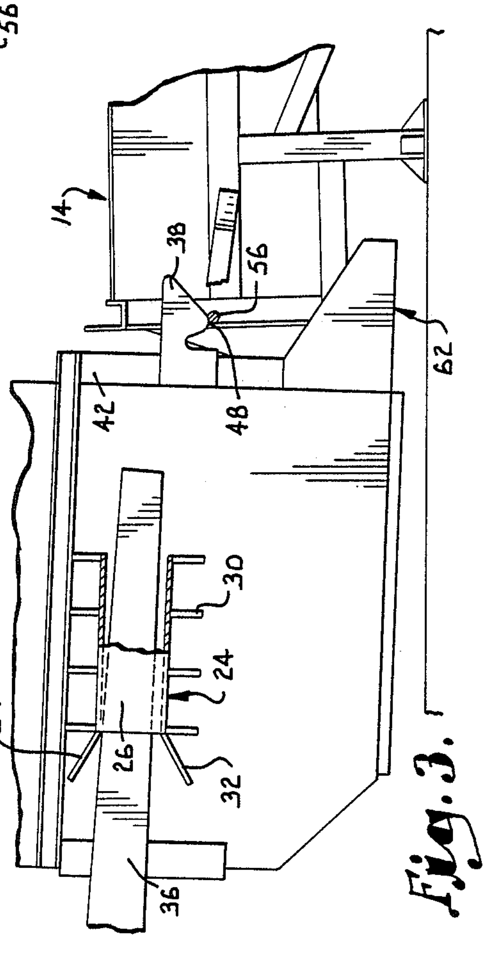
FIG. 3 is a view similar to FIG. 2 but showing the container elevated by the cam surfaces of the locking arms.

The vertical height of the arms 38 and 40 and the height of the pins 56 is such that the leading edges of the arms engage their corresponding pins when the container is moved toward the end of the compactor as illustrated in FIG. 2 of the drawing. The edges 46 of the arms cam the container upwardly during continued movement of the container toward the compactor. The transversely circular cross-sectional configuration of the pins facilitate the gliding of the cam surfaces upwardly on the pins. When the transitional surfaces 48 reaches their pins as shown in FIG. 3, slight additional movement of the container by the truck lifting arms 36 allow the pins to move into their respective notches 50. The upwardly and rearwardly inclined outermost edges 52 of the respective notches causes the container to be drawn tightly against the proximal end of the compactor as the container moves downwardly under the influence of gravity to the position where the pins 56 are seated at the uppermost ends of their respective notches as shown in FIG. 4.

When the pins are fully seated in their notches, the container is firmly locked to the compactor. The horizontal forces imparted to the container by the refuse compacting ram of the compactor cannot dislodge the container when the latter is in this position. The interlock is effected without the necessity for auxiliary operator attention. Further, as will be explained, the secure interlock may be readily disengaged for removing the container, also without the necessity or auxiliary operator attention.

The use of the arms 38 and 40 and the pin means 54 to releasably interlock the container to the compactor obviates the necessity for the operator to precisely position the container with respect to the compactor when installing the container in its refuse receiving position. On the contrary, the operator may manipulate the lifting arms 36 of the truck to bring the container into the general proximity of the end of the compactor as illustrated in FIG. 2. It is relatively easy for the operator to move the container in alignment with the compactor from the operator's position in the cab of the truck. Since the end of the container proximal the compactor is obscured from the operator's view, it is difficult for the operator to be aware of the precise positions of the locking arms 38 and 40 with respect to their corresponding pins during this operation. However, the arms engage the pins and automatically manipulate the container to move the notches over the pins. As the arms are cammed upwardly on the arm ends, the container is rotated about a horizontal axis extending transversely through the container. Clearance for such rotation is provided by virtue of the fact that the slots 28 are substantially wider than the truck lifting arms 36.

From this point, all that is required of the operator to securely lock the container into firm refuse transfer position with respect to the compactor is to move the container forwardly until the configuration of the notches permit the relatively heavy container to rotate downwardly about the transverse axis to seat the pins in the notches. The slight upward and rearward inclination of the forward notch edges 52 pulls the container into firm engagement with the compactor, sealing against leakage. Any liquid leakage which might occur at the junction between the container and the compactor is caught by the receiving pan 62 as is described in the aforementioned U.S. Pat. No. 4,538,512.

Release of the container from its locked engagement with the compactor is, of course, effected essentially by a reversal of the steps involved in installation of the compactor. Accordingly, when it is desired to remove the container such as for emptying the contents into a hauling vehicle, the operator of the truck moves the lifting arms 36 of the truck hoisting apparatus into the slots 28 of the container. He then operates the arms to hoist the leading end of the container sufficiently to remove the locking arms from engagement with the locking pins. Actually, in view of the configuration of the notches, the operator may lift the container slightly and simultaneously back the lifting arms to withdraw the container from the compactor. Again, the transversely circular pins slide along the inclined edges 52 of the locking arms to cam the proximal end of the container upwardly as the edges 52 slide along the outer surfaces of the pins.

Once the container is released, the hauling vehicle operator can manipulate the arms to hoist the container to unload the contents into the truck. Reinstallation of the container into its locked relationship with the compactor is again carried out as heretofore described.

Having thus described the invention, I claim:

1. Apparatus for releasably interconnecting a movable refuse container with a stationary refuse compactor, said apparatus comprising:

a pair of rigid pins rigidly secured to the compactor, the pins extending generally horizontally outwardly from respective opposite sides of the compactor; and an elongated, rigid arm for each pin respectively, each arm being rigidly secured to the container and projecting outwardly therefrom in disposition in engage its corresponding compactor pin when the container is moved into refuse loading position adjacent the compactor, each arm having a cam surface sloping downwardly and toward said container on its leading edge disposed to engage its corresponding pin to elevate the container to an elevated position upon movement of the container toward the compactor, each arm being provided with a vertically extending, downwardly opening notch spaced inboard of the arm from said cam surface, each notch being defined by a pair of edges spaced apart longitudinally of the corresponding arm, the edge of each notch most remote from the container being inclined downwardly and outwardly at an angle from the container the notch being disposed to receive the corresponding compactor pin therein to permit lowering of the container by gravity from the elevated position and into said refuse loading position, the notches being disposed relative to their respective pins whereby said downwardly and outwardly inclined notch edges slide on their corresponding pins during such lowering to pull the container into tight engagement against the compactor, the pins disposed in the arms notches locking the container to the compactor to prevent movement of the container by horizontal forces generated during the transfer of refuse from the compactor to the container.

2. Apparatus as set forth in claim 1, wherein said pins are of transversely circular configuration, whereby to facilitate the camming of the container upwardly as the container is moved toward the compactor with the cam surfaces of the arms engaged against the pins.

3. Apparatus as set forth in claim 1, wherein each pin is elongated, the innermost end of each pin being secured to the outer surface of said compactor with the pin projecting substantially horizontally outwardly therefrom, and wherein is provided brace means secured to the compactor and to the outer end of the pin to support the pin against deflection under the influence of forces imparted by the locking arms against the pins as the container is moved into refuse loading position.

4. Apparatus as set forth in claim 1, wherein said arm is provided with a curved, downwardly convex transition surface between the lowermost end of the cam surface and the proximal edge of said notch.

* * * * *